United States Patent
Taniguchi et al.

(10) Patent No.: US 8,066,808 B2
(45) Date of Patent: *Nov. 29, 2011

(54) INK SET FOR INK-JET RECORDING

(75) Inventors: Akihiko Taniguchi, Kakamigahara (JP); Narumi Koga, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 407 days.

This patent is subject to a terminal disclaimer.

(21) Appl. No.: 12/051,870

(22) Filed: Mar. 20, 2008

(65) Prior Publication Data

US 2008/0302270 A1 Dec. 11, 2008

(30) Foreign Application Priority Data

Mar. 22, 2007 (JP) ................... 2007-074890

(51) Int. Cl.
*C09D 11/02* (2006.01)

(52) U.S. Cl. .................... 106/31.27; 106/31.6

(58) Field of Classification Search ............... 106/31.27, 106/31.6
See application file for complete search history.

(56) References Cited

U.S. PATENT DOCUMENTS

| | | | |
|---|---|---|---|
| 7,248,796 B2 | 7/2007 | Triteyaprasert et al. | |
| 7,713,343 B2 * | 5/2010 | Goto et al. | 106/31.48 |
| 7,727,321 B2 * | 6/2010 | Goto et al. | 106/31.48 |
| 7,736,424 B2 * | 6/2010 | Hamajima et al. | 106/31.27 |
| 7,736,425 B2 * | 6/2010 | Kato et al. | 106/31.27 |
| 2007/0186806 A1 * | 8/2007 | Goto et al. | 106/31.48 |
| 2007/0188573 A1 * | 8/2007 | Hamajima et al. | 347/100 |

FOREIGN PATENT DOCUMENTS

| | | |
|---|---|---|
| JP | 05-255625 | 10/1993 |
| JP | 2002-220558 | 8/2002 |
| JP | 2003-292811 | 10/2003 |
| JP | 2004-107633 | 4/2004 |
| JP | 2006-096990 | 4/2006 |

* cited by examiner

*Primary Examiner* — Jerry A Lorengo
*Assistant Examiner* — Veronica F Faison
(74) *Attorney, Agent, or Firm* — Banner & Witcoff, Ltd.

(57) ABSTRACT

An ink set for ink-jet recording includes a plurality of color inks, wherein the following formulae (a) to (d) are satisfied.

Light OD reduction rate $(X\%)=[(A-B)/A]\times 100$     (a)

Ozone OD reduction rate $(Y\%)=[(C-D)/C]\times 100$     (b)

Total OD reduction rate $(Z\%)=X+Y<\text{about } 40\%$     (c)

$Z_{max}-Z_{min}<\text{about } 15\%$     (d)

"A" and "B" are OD values before and after a light fastness test for a first single-color patch, respectively, and "c" and "D" are OD values before and after an ozone resistance test for a second single-color patch, respectively. "Zmax" and "Zmin" are a maximum and a minimum of all the total OD reduction rates (Z), respectively.

7 Claims, No Drawings

INK SET FOR INK-JET RECORDING

CROSS REFERENCE TO RELATED APPLICATION

The present invention claims a priority from Japanese Patent Application No. 2007-074890, which was filed on Mar. 22, 2007, the disclosure of which is herein incorporated by reference in its entirety.

BACKGROUND

1. Field of the Invention

The present invention relates to an ink set for ink-jet recording which contains a plurality of color inks and which has a satisfactory color fading balance in a printout caused by light or ozone in the actual environment.

2. Description of the Related Art

An ink set for ink-jet recording generally includes a plurality of color inks such as a yellow ink, a magenta ink, and a cyan ink. In color printouts obtained by ink-jet recording using these color inks, a problem of color fading is caused by an action of light or ozone in air, because these color inks include organic dyes or organic pigments as colorants.

Consequently, a colorant having good light fastness and a colorant having good ozone resistance have been proposed as colorants used for an ink set for ink-jet recording.

In this situation, in a plurality of color inks constituting a known ink set for ink-jet recording, satisfactory light fastness and satisfactory ozone resistance cannot be realized at the same time. Therefore, after a color printout prepared by using an ink set for ink-jet recording is left to stand for a long time in an actual environment in which light and ozone are present at the same time, a problem of disruption of the color fading balance of the color printout occurs.

SUMMARY

An aspect of the present invention provides an ink set for ink-jet recording including a plurality of color inks, wherein the following formulae (a) to (d) are satisfied Light OD reduction rate $(X\%) = [(A-B)/A] \times 100$ (a)

Ozone OD reduction rate $(Y\%) = [(C-D)/C] \times 100$ (b)

Total OD reduction rate $(Z\%) = X+Y<$ about 40% (c)

Zmax−Zmin<about 15% (d), where, in the formulae (a) to (d),

"A" is an OD (optical density) value before a light fastness test performed for a first single-color patch;

"B" is an OD value after a light fastness test performed for a first single-color patch;

"C" is an OD value before an ozone resistance test performed for a second single-color patch;

"D" is an OD value after an ozone resistance test performed for a second single-color patch;

"Zmax" is a maximum of all the total OD reduction rates (Z);

"Zmin" is a minimum of all the total OD reduction rates (Z);

a first single-color patch and a second single-color patch are prepared separately by conducting printing on ink jet recording paper by use of each of all the color inks under the same printing conditions;

the light fastness test is performed by irradiating the first single-color patch at an illuminance of 93 klx with light, emitted from a xenon lamp, for 40 hours at a temperature of 25° C. and a relative humidity of 50%; and the ozone resistance test is performed by exposing the second single-color patch to an atmosphere with an ozone concentration of 2 ppm for 40 hours at a temperature of 24° C. and a relative humidity of 60%.

DESCRIPTION OF THE PREFERRED EMBODIMENTS

An object of the present invention is to prevent significant color fading and to realize a satisfactory color fading balance, when a color printout prepared by using an ink set for ink-jet recording including a plurality of color inks is left to stand in an actual environment in which light and ozone in air are present at the same time and even if some color fading occurs.

The present inventors have conceived that color fading that is generated when a printout prepared by using an ink set for ink-jet recording including a plurality of color inks is left to stand in an actual environment (e.g., in a general office environment or a general household environment) corresponds to the sum of light color fading and ozone color fading. More specifically, the present inventors have found the following: A light fastness test is performed by using a first single-color patch, and an ozone resistance test is performed by using a second single-color patch, where the first single-color patch and the second-single color patch are obtained separately by conducting printing on ink jet recording paper by use of each of all the color inks under the same printing conditions. The light fastness test and the ozone resistance test are performed for the first single-color patch and the second single colorpatch, respectively, under conditions in which the first and second single-color patches are left to stand in substantially the same actual environment. In this case, the sum of the rate of the difference between an OD value before the light fastness test and an OD value after the light fastness test to the OD value before the light fastness test performed for the first single-color patch, and the rate of the difference between an OD value before the ozone resistance test and an OD value after the ozone resistance test to the OD value before the ozone resistance test performed for the second single-color patch (i.e., the total OD reduction rate calculated by adding the OD reduction rate in the light fastness test and the OD reduction rate in the ozone resistance test) is controlled to be less than a predetermined value for all the color inks. Thereby, significant color fading may be suppressed. In addition, the difference between the maximum total OD reduction rate and the minimum total OD reduction rate among all the total OD reduction rates of the OD values for all the color inks is controlled to be less than a predetermined value. Thereby, a satisfactory color fading balance may be realized.

An ink set for ink-jet recording includes a plurality of color inks, at least a yellow ink, a magenta ink and a cyan ink. As described below, when a predetermined light fastness test and a predetermined ozone resistance test are performed for color printouts obtained using these color inks, the color inks have particular features, which cannot be achieved by conventional ink sets, in respect of an OD of a printout.

The total OD reduction rate for each of all the color inks is less than about 40%. Therefore, when a printout is left to stand in an actual environment, significant color fading may be suppressed. Furthermore, the difference between the maximum total OD reduction rate and the minimum total OD reduction rate among all the total OD reduction rates for a plurality of color inks is controlled to be less than about 15%. Therefore, a satisfactory color fading balance may be realized. Accordingly, even when a printout prepared by using the ink set for ink-jet recording of an aspect of the present invention is left to stand in an actual environment in which light and ozone are present at the same time, significant color fading may be prevented and a satisfactory color fading balance may be realized. Consequently, a change in colors between before and after color fading of the printout may be minimized.

A light fastness test is performed by using a first single-color patch obtained by printing on ink-jet paper with a color ink. The light resistance test is performed by irradiating the first single-color patch at an illuminance of 93 klux with light, emitted from a xenon lamp as a light source, for 40 hours at a temperature of 25° C. and a relative humidity of 50%. An ozone resistance test is performed using a second single-color patch prepared by printing under the same conditions as those used for preparing the first single-color patch used in the light resistance test. In the ozone resistance test, the second single-color patch is exposed to an atmosphere with an ozone concentration of 2 ppm for 40 hours at a temperature of 24° C. and a relative humidity of 60%. The light fastness test and the ozone resistance test are performed for the first-single color patch and the second-single color patch, respectively, with respect to each of all the color inks. In these tests, the following formulae are satisfied:

Light OD reduction rate $(X\%)$ $[(A-B)/A] \times 100$      (a)

Ozone OD reduction rate $(Y\%)=[(C-D)/C] \times 100$      (b)

Total OD reduction rate $(Z\%)=X+Y<$ about 40%      (c)

Zmax−Zmin<about 15%      (d), where, in the formulae (a) to (d),

"A" is an OD value before a light fastness test performed for a first single-color patch;

"B" is an OD value after a light fastness test performed for a first single-color patch;

"C" is an OD value before an ozone resistance test performed for a second single-color patch;

"D" is an OD value after an ozone resistance test performed for a second single-color patch;

"Zmax" is a maximum of all the total OD reduction rates (Z) (or a maximum total OD reduction rate); and "Zmin" is a minimum of all the total OD reduction rates (Z) (or a minimum total OD reduction rate).

<Conditions for Light Fastness Test>

A light fastness test is performed, at a temperature of 25° C. and a relative humidity of 50%, by irradiating a single-color patch with light having an illuminance of 93 klx emitted from a xenon lamp as a light source for 40 hours (corresponding to about two years in an actual environment; calculated under the condition that the amount of light exposure for one day is 5 klx·h (0.5 klx×10 hours) and the amount of light exposure for one year is 1,825 klx·h (5 klx·h×365 days)). It is known that the results of the light fastness test are substantially the same even if the temperature is changed within 25° C.±about 2° C. and the relative humidity is changed within 50%±about 10%. The light fastness test may be performed using, for example, a high-energy xenon weather meter SC750-WN manufactured by Suga Test Instruments Co., Ltd.

<Conditions for Ozone Resistance Test>

An ozone resistance test is performed, at a temperature of 24° C. and a relative humidity of 60%, by exposing a single-color patch to an atmosphere with an ozone concentration of 2 ppm for 40 hours (corresponding to about two years in an actual environment; calculated under the condition that the amount of ozone exposed for one year is 40 ppm·h). It is known that the results of the ozone resistance test are substantially the same even if the temperature is changed within 24° C.±about 2° C., but the results thereof change if the relative humidity is changed from 60%. The ozone resistance test may be performed using, for example, an ozone weather meter OMS-H manufactured by Suga Test Instruments Co., Ltd.

An example of the ink-jet paper is paper called "glossy paper" in which a layer that accepts an ink for ink-jet recording is provided on at least one surface of plain paper. Examples thereof include, without limitation, glossy photo paper BP61GLA manufactured by Brother Industries, Ltd.; color ink-jet premium glossy photo paper manufactured by Oji Paper Co., Ltd.; ink-jet printer high-definition photo output high-gloss paper manufactured by KOKUYO Co., Ltd.; Photolike OP 4Photo Quality> series manufactured by Konica Minolta holdings, Inc.; and KASSAI® series including Shashin shiage (photo-finish) Pro, Shashin shiage (photo-finish) Advance, and FUJIFILM high-quality glossy paper manufactured by FUJIFILM Corporation.

In the ink set for ink-jet recording, a plurality of color inks constituting the ink set satisfy the following conditions (1) and (2) at the same time.

(1) The total OD reduction rate as defined above upon using each of all the color inks is less than about 40%, and less than about 35%.

(2) The difference between "Zmax" and "Zmin" as defined above is less than about 15%, and less than about 10%.

The reason why the total OD reduction rate as defined above with respect to all the color inks is controlled to be less than about 40% is as follows. In this case, when a printout is left to stand in an actual environment, significant color fading may be suppressed, compared with the case where the total OD reduction rate is about 40% or more. The reason why the difference between the maximum total OD reduction rate and the minimum total OD reduction rate among all the total OD reduction rates upon using all the color inks is controlled to be less than about 15% is as follows. In this case, a satisfactory color fading balance may be realized, compared with the case where the difference in the total OD reduction rate is about 15% or more.

The ink set for ink-jet recording may be produced by preparing a plurality of color inks obtained by dissolving or dispersing a colorant in a water-soluble organic solvent, and forming an ink set. However, the plurality of color inks are selected so that the color inks have predetermined characteristics in terms of the OD of a printout after the above-described predetermined light fastness test and ozone resistance test are performed.

Examples of the colorant that may be used in the color inks constituting the ink set for ink-jet recording of an aspect of the present invention include water-soluble dyes such as direct dyes, acid dyes, basic dyes, and reactive dyes. Examples thereof include, without limitation, cyan dyes represented by general formulae (1) and (2); magenta dyes represented by general formula (4) and general formula (5) in the form of a free acid; direct dyes such as C. I. Direct Blues 6, 22, 25, 71, 86, 90, 106 and 199, C. I. Direct Reds 1, 4, 17, 28, 83 and 227, C. I. Direct Yellows 12, 24, 26, 86, 98, 132 and 142, C. I. Direct Oranges 34, 39, 44, 46 and 60, C. I. Direct Violets 47 and 48, C. I. Direct Brown 109, C. I. Direct Green 59, and the like; acid dyes such as C. I. Acid Blues 9, 22, 40, 59, 93, 102, 104, 113, 117, 120, 167, 229 and 234, C. I. Acid Reds 1, 6, 32, 37, 51, 52, 80, 85, 87, 92, 94, 115, 181, 256, 289, 315 and 317, C. I. Acid Yellows 11, 17, 22, 25, 29, 42, 61 and 71, C. I. Acid Oranges 7 and 19, C. I. Acid Violet 49, and the like; basic dyes such as C. I. Basic Blues 1, 3, 5, 7, 9, 24, 25, 26, 28 and 29, C. I. Basic Reds 1, 2, 9, 12, 13, 14 and 37, C. I. Basic violets 7, 14 and 27, and the like; reactive dyes such as C. I. Reactive Blues 2, 5, 7, 12, 13, 14, 15, 17, 18, 19, 20, 21, 25, 27, 28, 37, 38, 40, 41 and 71, C. I. Reactive Reds 6, 7, 11, 12, 15, 17, 21, 23, 24, 35, 36, 42, 63, 66 and 180, C. I. Reactive Yellows 1, 2, 3, 13, 14, 15 and 17, C. I. Reactive Oranges 2, 5, 7, 16, 20 and 24, C. I. Reactive Violets 2, 4, 5, 8 and 9, C. I. Reactive Browns 1, 7 and 16, C. I. Reactive Greens 5 and 7, and the like; and Food Blacks 1 and 2, and the like. Inks having a desired color may be obtained by using at least one of these colorants. Alternatively, pigments may be used as colorants of the color inks.

(General Formula (1))

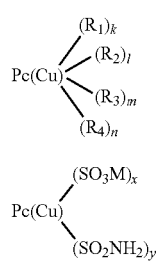

(General Formula (2))

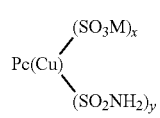

(General Formula (3))

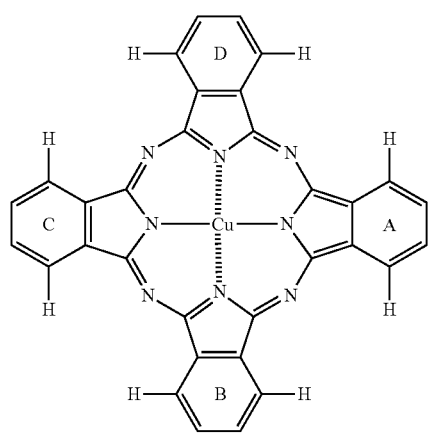

In general formulae (1) and (2), Pc(Cu) represents a copper phthalocyanine nucleus represented by general formula (3).

In general formula (1), $R_1$, $R_2$, $R_3$, and $R_4$ do not simultaneously represent the same substituent and each independently represent a substituent selected from the group of $-SO_2-R_a$, $-SO_2NR_bR_c$, and $-CO_2-R_a$. At least one of $R_1$, $R_2$, $R_3$, and $R_4$ has an ionic hydrophilic group as a substituent. At least one of $R_1$, $R_2$, $R_3$, and $R_4$ is present in each of the four benzene rings A, B, C, and D in the copper phthalocyanine nucleus represented by general formula (3). $R_a$ represents a substituted or unsubstituted alkyl group, $R_b$ represents a hydrogen atom, or a substituted or unsubstituted alkyl group, and $R_c$ represents a substituted or unsubstituted alkyl group. In addition, k represents a number that satisfies the relationship $0<k<8$, l represents a number that satisfies the relationship $0<l<8$, m represents a number that satisfies the relationship $0 \leq m<8$, and n represents a number that satisfies the relationship $0 \leq n<8$. Furthermore, k, l, m and n are numbers that satisfy the relationship $4 \leq k+l+m+n \leq 8$.

In general formula (2), each of an $SO_3M$ group, and an $SO_2NH_2$ group is present in any of the four benzene rings A, B, C, and D in the copper phthalocyanine nucleus represented by general formula (3). M represents a monovalent metal cation selected from the group of a lithium ion, a sodium ion, and a potassium ion; x represents a number that satisfies the relationship $0<x<4$; y represents a number that satisfies the relationship $0<y<4$; and x and y represent numbers that satisfy the relationship $2 \leq x+y \leq 5$.

(General Formula (4))

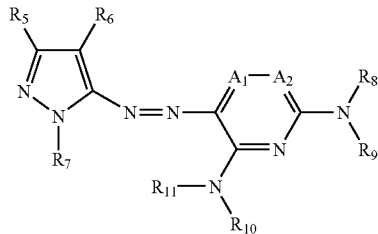

In general formula (4), $R_5$ represents a hydrogen atom, a substituted or unsubstituted alkyl group, or a substituted or unsubstituted aryl group; $R_6$ represents a hydrogen atom, a halogen atom, or a cyano group; $R_7$ represents a hydrogen atom, a substituted or unsubstituted alkyl group, a substituted or unsubstituted aryl group, or a substituted or unsubstituted heterocyclic group; and $R_8$, $R_9$, $R_{10}$, and $R_{11}$ each independently represent a hydrogen atom, a substituted or unsubstituted alkyl group, a substituted or unsubstituted aryl group, a substituted or unsubstituted heterocyclic group, a substituted or unsubstituted sulfonyl group, or a substituted or unsubstituted acyl group. However, both $R_8$ and $R_9$ are not hydrogen atoms at the same time, and both $R_{10}$ and $R_{11}$ are not hydrogen atoms at the same time. Both $A_1$ and $A_2$ are substituted or unsubstituted carbon atoms, or one of $A_1$ and $A_2$ is a substituted or unsubstituted carbon atom and the other is a nitrogen atom.

(General Formula (5))

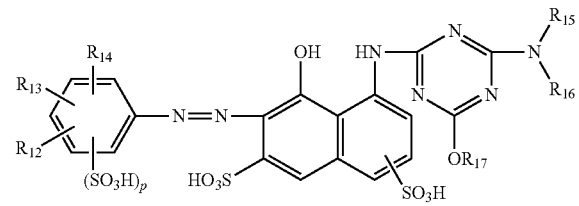

In general formula (5), $R_{12}$, $R_{13}$, and $R_{14}$ each independently represent a substituted or unsubstituted alkyl group, a substituted or unsubstituted alkoxy group, a halogen atom, a hydrogen atom, a hydroxyl group, a substituted or unsubstituted carbamoyl group, a substituted or unsubstituted sulfamoyl group, a substituted or unsubstituted amino group, a nitro group, a sulfonate group, a substituted or unsubstituted alkyl sulfonyl group, a substituted or unsubstituted aryl sulfonyl group, a carboxyl group, or a carboxylate group; p represents an integer of 0, 1, or 2; and $R_{15}$, $R_{16}$, and $R_{17}$ each independently represent a hydrogen atom, a substituted or unsubstituted alkyl group, a substituted or unsubstituted alkenyl group, a substituted or unsubstituted aryl group, a substituted or unsubstituted aralkyl group, a substituted or unsubstituted alicyclic group, or a substituted or unsubstituted heterocyclic group.

The amount of the colorant contained in a color ink of the ink set for ink-jet recording is different in accordance with the desired print density, color, and the like. However, in order to realize a satisfactory color development on paper, the amount of the colorant is about 0.1 wt. % or more relative to the total weight of the color ink. In order to suppress clogging of a nozzle of an ink-jet head, the amount of the colorant is about 10 wt. % or less, and in the range of about 1 wt. % to about 7 wt. %.

In order to improve the storage stability of color inks, a dispersant may be added to the color inks constituting the ink set for ink-jet recording, as needed.

As water used in the color inks constituting the ink set for ink-jet recording, ion-exchange water containing relatively small amounts of salts is used. The amount of water in a color ink depends on the amounts of the other components such as the colorant, the dispersant and the like, because the amount of water is determined as the balance of the color ink where the balance corresponds to a remainder upon subtracting the amount of the other components from the total amount of the color ink. However, the amount of water in each color ink is generally in the range of about 10 wt. % to about 90 wt. %, and in the range of about 40 wt. % to about 80 wt. % relative to the total weight of the color ink.

The water-soluble organic solvent used in color inks constituting the ink set for ink-jet recording contains a humectant for mainly preventing an ink at a nozzle tip of an ink-jet head from becoming dry, and a penetrant for mainly controlling the drying velocity on recording paper.

Examples of the humectant include, without limitation, lower alcohols such as methyl alcohol, ethyl alcohol, n-propyl alcohol, isopropyl alcohol, n-butyl alcohol, sec-butyl alcohol, tert-butyl alcohol, and the like; polyhydric alcohols such as 1,3-butanediol, 1,5-pentanediol, 1,6-hexanediol, glycerin, 1,2,6-hexanetriol, 1,2,4-butanetriol, 1,2,3-butanetriol, and the like; alkylene glycols such as ethylene glycol, diethylene glycol, triethylene glycol, propylene glycol, dipropylene glycol, tripropylene glycol, butylene glycol, thiodiglycol, hexylene glycol, and the like; polyalkylene glycols such as polyethylene glycol, polypropylene glycol, and the like; amides such as formamide, N-methylformamide, N,N-dimethylformamide, dimethylacetamide, and the like; amines such as monoethanolamine, diethanolamine, triethanolamine, monoethylamine, diethylamine, triethylamine, and the like; ketones or keto-alcohols such as acetone, diacetone alcohol, and the like; ethers such as tetrahydrofuran, dioxane, and the like; nitrogen-containing heterocyclic compounds such as 2-pyrrolidone, N-methyl-2-pyrrolidone, N-hydroxyethyl-2-pyrrolidone, 1,3-dimethylimidazolidinone, $\epsilon$-caprolactam, and the like; sulfur-containing compounds such as dimethyl sulfoxide, sulfolane, thiodiethanol, and the like; and the like. These humectants may be used alone or as a mixture of two or more compounds.

The amount of the humectant in a color ink is generally in the range of 0 to about 95 wt. %, in the range of about 10 wt. % to about 80 wt. %, and in the range of about 10 wt. % to about 50 wt. % relative to the total weight of the color ink.

Examples of the penetrant include, without limitation, ethylene glycol methyl ether, ethylene glycol ethyl ether, ethylene glycol propyl ether, ethylene glycol butyl ether, diethylene glycol methyl ether, diethylene glycol ethyl ether, diethylene glycol propyl ether, diethylene glycol butyl ether, diethylene glycol dimethyl ether, diethylene glycol diethyl ether, diethylene glycol dipropyl ether, diethylene glycol dibutyl ether, triethylene glycol methyl ether, triethylene glycol ethyl ether, triethylene glycol propyl ether, triethylene glycol butyl ether, triethylene glycol dimethyl ether, triethylene glycol diethyl ether, triethylene glycol dipropyl ether, triethylene glycol dibutyl ether, propylene glycol methyl ether, propylene glycol ethyl ether, propylene glycol propyl ether, propylene glycol butyl ether, dipropylene glycol methyl ether, dipropylene glycol ethyl ether, dipropylene glycol propyl ether, dipropylene glycol butyl ether, dipropylene glycol dimethyl ether, dipropylene glycol diethyl ether, dipropylene glycol dipropyl ether, dipropylene glycol dibutyl ether, tripropylene glycol methyl ether, tripropylene glycol ethyl ether, tripropylene glycol propyl ether, tripropylene glycol butyl ether, tripropylene glycol dimethyl ether, tripropylene glycol diethyl ether, tripropylene glycol dipropyl ether, tripropylene glycol dibutyl ether, and the like. These penetrants may be used alone or as a mixture of two or more compounds.

The amount of the penetrant in a color ink is generally in the range of 0 to about 20 wt. %, in the range of about 0.1 wt. % to about 15 wt. %, and in the range of about 1 wt. % to about 10 wt. % relative to the total weight of the color ink. Note that if the amount of the penetrant is excessively high, the penetrability of the color ink on recording paper becomes excessively high, thus causing feathering.

The color inks may further contain known additives such as a surfactant; a viscosity modifier, e.g., polyvinyl alcohol, polyvinylpyrrolidone, or a water-soluble resin; a surface tension modifier; a pH adjuster; a mildew proofing agent; and an anticorrosive agent, as needed.

In the ink set for ink-jet recording, a black ink may be used in combination with the color inks. Examples of a colorant that may be used in the black ink include black dye and black pigment. Examples of the black dye include, without limitation, direct dyes such as C. I. Direct Blacks 17, 19, 32, 51, 71, 108, 146, 154, 168, and the like; acid dyes such as C. I. Acid Blacks 2, 7, 24, 26, 31, 52, 63, 112, 118, and the like; basic dyes such as C. I. Basic Black 2, and the like; reactive dyes such as C. I. Reactive Browns 1, 7, 16, and the like; Food Blacks 1, 2, and the like. Examples of the black pigment include, without limitation, inorganic pigments such as carbon black, titanium oxides, iron oxides, and the like; self-dispersing pigments prepared by treating the surface of a pigment with a surfactant, a polymer dispersant, or the like. Commercially available self-dispersing pigments may be used. Examples thereof include, without limitation, CAB-O-JET® 200 and 300 manufactured by Cabot Corporation; BONJET® BLACK CW-1 and CW-2 manufactured by Orient Chemical Industries, Ltd; and the like. These black colorants may be used alone or in combination of two or more colorants to obtain an ink having a desired color.

The ink set for ink-jet recording may be used by accommodating a plurality of color inks prepared by a known method in a desired ink cartridge, and then setting the ink cartridge in an ink-jet printer.

EXAMPLES

Examples 1 to 5, and Comparative Examples 1 to 5

Inks summarized in Tables 1 and 2 were prepared by a known method. The prepared inks were filled in desired ink cartridges to produce ink sets for ink-jet recording of examples and comparative examples. Each of the ink cartridges was set in a digital multifunction device including an ink-jet printer (DCP-110C manufactured by Brother Industries, Ltd.), and printing evaluation was performed. Evaluation samples were prepared by printing a single-color gradation sample on glossy photo paper (BP61GLA manufactured by Brother Industries, Ltd.) using inks of three colors (i.e., yellow, magenta, and cyan), and thus preparing patches showing an initial OD value of about 1.0.

In Tables 1 and 2, Cyan dye (C1), Cyan dye (C2), Cyan dye (C3), Cyan dye (C4), Magenta dye (M1), and Magenta dye (M2) were dyes shown below.

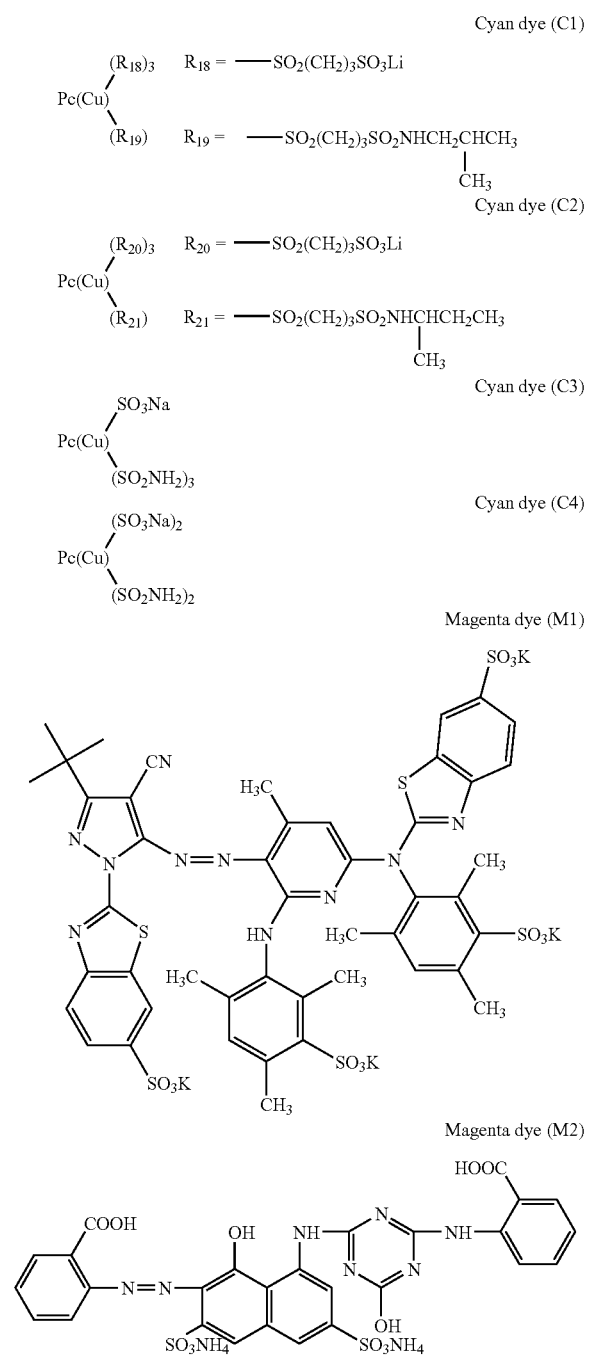

A light fastness test and an ozone resistance test were performed as described below using the prepared evaluation samples.

<Light Resistance Test>

A light fastness test was performed using the above-mentioned evaluation samples. The light fastness test was performed using a high-energy xenon weather meter SC750-WN manufactured by Suga Test Instruments Co., Ltd. The test was performed by irradiating the evaluation samples at an illuminance of 93 klx with light, emitted from a xenon lamp as a light source, for 40 hours at a temperature of 25° C. and a relative humidity of 50% in a chamber. After the light fastness test was performed, the OD values of the evaluation samples of three colors (i.e., yellow, magenta, and cyan) that had shown an OD value of about 1.0 before the test were measured. The OD values were measured using a Spectrolino spectrophotometer manufactured by Gretag Macbeth (light source; $D_{65}$; field of view; 2°; status; A). The light OD reduction rates of the evaluation samples that had shown an OD value of about 1.0 before the test were determined using equation (i):

Light OD reduction rate (%)=[(OD value before light fastness test−OD value after light fastness test)/ OD value before light fastness test]×100  (i)

<Ozone Resistance Test>

An ozone resistance test was performed using the above-mentioned evaluation samples. The ozone resistance test was performed using an ozone weather meter OMS-H manufactured by Suga Test instruments Co., Ltd. The evaluation samples were left to stand in an atmosphere with an ozone concentration of 2 ppm for 40 hours at a temperature of 24° C. and a relative humidity of 60% in a chamber. After the ozone resistance test was performed, the OD values of the evaluation samples of three colors (i.e., yellow, magenta, and cyan) that had shown an OD value of about 1.0 before the test were measured. The OD values were measured using a spectrophotometer Spectrolino manufactured by Gretag Macbeth (light source: $D_{65}$; field of view: 2°; status: A). The OD reduction rates (ozone OD reduction rates) of the evaluation samples that had shown an OD value of about 1.0 before the test were determined using equation (ii);

Ozone OD reduction rate (%)=[(OD value before ozone resistance test−OD value after ozone resistance test)/OD value before ozone resistance test]×100  (ii)

Table 3 summarizes the reduction rates upon using the single-color inks. In addition, the total OD reduction rate was determined as the sum of the light OD reduction rate in the light fastness test and the ozone OD reduction rate in the ozone resistance test performed for each of all the single-color inks. Furthermore, among the total OD reduction rates, a maximum total OD reduction rate was determined with respect to each of all the single-color inks. Table 3 summarizes the results. In addition, a difference between the maximum total OD reduction rate and the minimum total OD reduction rate (i.e., the maximum difference between any two of all the total OD reduction rates) among all the total OD reduction rates with respect to three types of inks of three colors constituting an ink set was calculated. Furthermore, the inks were evaluated in accordance with the criteria for evaluation described below. An ink evaluated as "C" in at least one item is judged not suitable for practical use.

<Maximum Total OD Reduction Rates>
A: less than 35%
B: 35% or more and less than 40%
C: 40% or more <Maximum Difference Between any Two of all Total OD Reduction Rates>
A: less than 10%
B: 10% or more and less than 15%
C: 15% or more <Color Fading Balance Test of Actual Image Sample>

Ink compositions summarized in Tables 1 and 2 were prepared in accordance with a known method. The prepared inks were filled in predetermined ink cartridges to produce ink sets for ink-jet recording of the examples and the comparative examples. Each of the ink cartridges was set in a digital multifunction device including an ink-jet printer (DCP-110C manufactured by Brother Industries, Ltd.). An actual image sample (JIS SCID No. 2) was then printed on glossy paper (glossy photo paper (BP61GLA manufactured by Brother Industries, Ltd.)).

A light fastness test and an ozone resistance test were sequentially performed using the prepared actual image samples under the conditions described below. The color fading balance of the actual image samples was visually evaluated on the basis of the criteria for evaluation described below. Table 3 summarizes the evaluation results.

<Light Fastness Test>

The light fastness test was performed using a high-energy xenon weather meter SC750-WN manufactured by Suga Test Instruments Co., Ltd. The test was performed in a chamber by irradiating the actual image samples at an illuminance of 93 klx with light, emitted from a xenon lamp as a light source, for 40 hours at a temperature of 25° C. and a relative humidity of 50%.

<Ozone Resistance Test>

The ozone resistance test was performed using an ozone weather meter OMS-H manufactured by Suga Test Instruments Co., Ltd. The actual image samples were left to stand in an atmosphere with an ozone concentration of 2 ppm for 40 hours at a temperature of 24° C. and a relative humidity of 60% in a chamber.

In Table 3, "G" and "NG" denote the following meanings;
G: It was not considered that the color fading balance of the actual image sample was disrupted.
NG: It was considered that the color fading balance of the actual image sample was disrupted.

TABLE 1

(Unit: wt. %)

|  |  | Example 1 | | | Example 2 | | | Example 3 | | |
|---|---|---|---|---|---|---|---|---|---|---|
|  |  | Cyan ink | Magenta ink | Yellow ink | Cyan ink | Magenta ink | Yellow ink | Cyan ink | Magenta ink | Yellow ink |
| Cyan dye | Cyan dye (C1) | 2.0 | — | — | 2.0 | — | — | — | — | — |
|  | Cyan dye (C2) | — | — | — | — | — | — | 2.5 | — | — |
|  | Cyan dye (C3) | 2.0 | — | — | 2.0 | — | — | — | — | — |
|  | Cyan dye (C4) | — | — | — | — | — | — | 1.0 | — | — |
|  | C.I. Direct Blue 199 | — | — | — | — | — | — | — | — | — |
| Magenta dye | Magenta dye (M1) | — | 1.5 | — | — | 2.0 | — | — | 2.0 | — |
|  | Magenta dye (M2) | — | 1.5 | — | — | 1.0 | — | — | 1.0 | — |
|  | C.I. Acid Red 289 | — | — | — | — | — | — | — | — | — |
| Yellow dye | C.I. Direct Yellow 86 | — | — | — | — | — | 1.5 | — | — | 0.5 |
|  | C.I. Direct Yellow 132 | — | — | 2.5 | — | — | — | — | — | 2.0 |
| — | Glycerin | 24.0 | 24.0 | 24.0 | 24.0 | 24.0 | 24.0 | 24.0 | 24.0 | 24.0 |
|  | Triethylene glycol butyl ether | 4.0 | 4.0 | 4.0 | 4.0 | 4.0 | 4.0 | 4.0 | 4.0 | 4.0 |
|  | Pure water | Bal. | Bal. | Bal. | Bal. | Bal. | Bal | Bal. | Bal. | Bal. |

|  |  | Example 4 | | | Example 5 | | |
|---|---|---|---|---|---|---|---|
|  |  | Cyan ink | Magenta ink | Yellow ink | Cyan ink | Magenta ink | Yellow ink |
| Cyan dye | Cyan dye (C1) | 3.5 | — | — | 3.5 | — | — |
|  | Cyan dye (C2) | — | — | — | — | — | — |
|  | Cyan dye (C3) | 0.5 | — | — | 0.5 | — | — |
|  | Cyan dye (C4) | — | — | — | — | — | — |
|  | C.I. Direct Blue 199 | — | — | — | — | — | — |
| Magenta dye | Magenta dye (M1) | — | 2.5 | — | — | 2.0 | — |
|  | Magenta dye (M2) | — | 0.5 | — | — | 1.0 | — |
|  | C.I. Acid Red 289 | — | — | — | — | — | — |
| Yellow dye | C.I. Direct Yellow 86 | — | — | — | — | — | 0.5 |
|  | C.I. Direct Yellow 132 | — | — | 2.5 | — | — | 2.0 |
| — | Glycerin | 24.0 | 24.0 | 24.0 | 24.0 | 24.0 | 24.0 |
|  | Triethylene | 4.0 | 4.0 | 4.0 | 4.0 | 4.0 | 4.0 |

TABLE 1-continued

|  |  |  |  |  |  |  |
|---|---|---|---|---|---|---|
| glycol butyl ether |  |  |  |  |  |  |
| Pure water | Bal. | Bal. | Bal. | Bal. | Bal. | Bal. |

TABLE 2

(Unit: wt. %)

|  |  | Comparative Example 1 ||| Comparative Example 2 ||| Comparative Example 3 |||
|---|---|---|---|---|---|---|---|---|---|---|
|  |  | Cyan ink | Magenta ink | Yellow ink | Cyan ink | Magenta ink | Yellow ink | Cyan ink | Magenta ink | Yellow ink |
| Cyan dye | Cyan dye (C1) | 4.0 | — | — | 4.0 | — | — | — | — | — |
|  | Cyan dye (C2) | — | — | — | — | — | — | 2.5 | — | — |
|  | Cyan dye (C3) | — | — | — | — | — | — | — | — | — |
|  | Cyan dye (C4) | — | — | — | — | — | — | 1.0 | — | — |
|  | C.I. Direct Blue 199 | — | — | — | — | — | — | — | — | — |
| Magenta dye | Magenta dye (M1) | — | 1.5 | — | — | 3.0 | — | — | — | — |
|  | Magenta dye (M2) | — | 1.5 | — | — | — | — | — | 3.0 | — |
|  | C.I. Acid Red 289 | — | — | — | — | — | — | — | — | — |
| Yellow dye | C.I. Direct Yellow 86 | — | — | — | — | — | 1.5 | — | — | 0.5 |
|  | C.I. Direct Yellow 132 | — | — | 2.5 | — | — | — | — | — | 2.0 |
| — | Glycerin | 24.0 | 24.0 | 24.0 | 24.0 | 24.0 | 24.0 | 24.0 | 24.0 | 24.0 |
|  | Triethylene glycol butyl ether | 4.0 | 4.0 | 4.0 | 4.0 | 4.0 | 4.0 | 4.0 | 4.0 | 4.0 |
|  | Pure wafer | Bal. | Bal. | Bal. | Bal. | Bal. | Bal. | Bal. | Bal. | Bal. |

|  |  | Comparative Example 4 ||| Comparative Example 5 |||
|---|---|---|---|---|---|---|---|
|  |  | Cyan ink | Magenta ink | Yellow ink | Cyan ink | Magenta ink | Yellow ink |
| Cyan dye | Cyan dye (C1) | — | — | — | — | — | — |
|  | Cyan dye (C2) | — | — | — | — | — | — |
|  | Cyan dye (C3) | — | — | — | — | — | — |
|  | Cyan dye (C4) | — | — | — | — | — | — |
|  | C.I. Direct Blue 199 | 3.5 | — | — | 3.5 | — | — |
| Magenta dye | Magenta dye (M1) | — | 2.5 | — | — | — | — |
|  | Magenta dye (M2) | — | 0.5 | — | — | — | — |
|  | C.I. Acid Red 289 | — | — | — | — | 2.5 | — |
| Yellow dye | C.I. Direct Yellow 86 | — | — | 1.5 | — | — | — |
|  | C.I. Direct Yellow 132 | — | — | — | — | — | 2.5 |
| — | Glycerin | 24.0 | 24.0 | 24.0 | 24.0 | 24.0 | 24.0 |
|  | Triethylene glycol butyl ether | 4.0 | 4.0 | 4.0 | 4.0 | 4.0 | 4.0 |
|  | Pure wafer | Bal. | Bal. | Bal. | Bal. | Bal. | Bal. |

TABLE 3

|  |  | Examples ||||| Comparative Examples |||||
|---|---|---|---|---|---|---|---|---|---|---|---|
|  |  | 1 | 2 | 3 | 4 | 5 | 1 | 2 | 3 | 4 | 5 |
| Light OD reduction rate (%) [=X] | Cyan ink | 5 | 5 | 3 | 2 | 2 | 2 | 2 | 3 | 7 | 7 |
|  | Magenta ink | 9 | 7 | 7 | 5 | 7 | 9 | 4 | 13 | 5 | 32 |
|  | Yellow ink | 18 | 19 | 18 | 18 | 18 | 18 | 19 | 18 | 19 | 18 |
| Ozone OD reduction rate (%) [=Y] | Cyan ink | 27 | 27 | 23 | 18 | 18 | 7 | 7 | 23 | 47 | 47 |
|  | Magenta Ink | 24 | 19 | 19 | 15 | 19 | 24 | 4 | 38 | 15 | 55 |
|  | Yellow ink | 16 | 13 | 15 | 16 | 15 | 16 | 13 | 15 | 13 | 16 |
| Total OD reduction rate (%) [=X + Y = Z] | Cyan ink | 32 | 32 | 26 | 20 | 20 | 9 | 9 | 26 | 54 | 54 |
|  | Magenta ink | 33 | 26 | 26 | 20 | 26 | 33 | 8 | 51 | 20 | 87 |
|  | Yellow ink | 34 | 32 | 33 | 34 | 33 | 34 | 32 | 33 | 32 | 34 |
| Maximum total OD reduction rate (%) [=Zmax] |  | 34 | 32 | 33 | 34 | 33 | 34 | 32 | 51 | 54 | 87 |
|  | Evaluation | A | A | A | A | A | A | A | C | C | C |
| Maximum difference between any two of all total OD reduction rates (%) [=Zmax − Zmin] |  | 2 | 6 | 7 | 14 | 13 | 25 | 24 | 25 | 34 | 53 |
|  | Evaluation | A | A | A | B | B | C | C | C | C | C |
| Color fading balance of actual image sample |  | G | G | G | G | G | NG | NG | NG | NG | NG |

The ink sets for ink-jet recording of Examples 1 to 5 had a maximum total OD reduction rate of about 40% or less and a maximum difference between any two of all the total OD reduction rates of less than about 15%. Therefore, color fading was suppressed and the ink sets showed a satisfactory color fading balance. In particular, the ink sets of Examples 1 to 3 had a maximum difference between any two of all the total OD reduction rates of less than 10%. Consequently, the color fading balances of these ink sets of Examples 1 to 3 were more satisfactory than those of the ink sets of Examples 4 and 5.

In contrast, in the ink sets for ink-jet recording of Comparative Examples 1 to 5, which had a maximum difference between any two of all the total OD reduction rates of more than 15%, the color fading balance was unsatisfactory. In particular, in the ink sets of Comparative Examples 3 to 5, because the maximum total OD reduction rate exceeded 40%, the color fading could not be suppressed.

The invention is not limited to the aspects described in the Examples, which are provided for illustrative purposes only. It will be apparent that various modifications can be made without departing from the spirit and the scope of the invention as described and claimed herein.

What is claimed is:

1. An ink set for ink-jet recording comprising a plurality of color inks, wherein the following formulae (a) to (d) are satisfied:

Light OD reduction rate $(X\%)=[(A-B)/A]\times 100$ (a)

Ozone OD reduction rate $(Y\%)=[(C-D)/C\times 100$ (b)

Total OD reduction rate $(Z\%)=X+Y<$about 40% (c)

Zmax−Zmin<about 15% (d), where, in the formulae (a) to (d),
"A" is an OD value before a light fastness test performed for a first single-color patch;
"B" is an OD value after a light fastness test performed for a first single-color patch;
"C" is an OD value before an ozone resistance test performed for a second single-color patch;
"D" is an OD value after an ozone resistance test performed for a second single-color patch;
"Zmax" is a maximum of all the total OD reduction rates (Z);
"Zmin" is a minimum of all the total OD reduction rates (Z);

a first single-color patch and a second single-color patch are prepared separately by conducting printing on ink jet recording paper by use of each of all the color inks under the same printing conditions;

the light fastness test is performed by irradiating the first single-color patch at an illuminance of 93 klx with light, emitted from a xenon lamp, for 40 hours at a temperature of 25° C. and a relative humidity of 50%; and the ozone resistance test is performed by exposing the second single-color patch to an atmosphere with an ozone concentration of 2 ppm for 40 hours at a temperature of 24° C. and a relative humidity of 60%.

2. The ink set for ink-jet recording according to claim 1, wherein the formula (d) is represented as below.

Zmax−Zmin<about 10%

3. The ink set for ink-jet recording according to claim 1, wherein the plurality of color inks comprises a yellow ink, a magenta ink, and a cyan ink.

4. The ink set for ink-jet recording according to claim 3, wherein the magenta ink comprises a dye represented by formula (4):

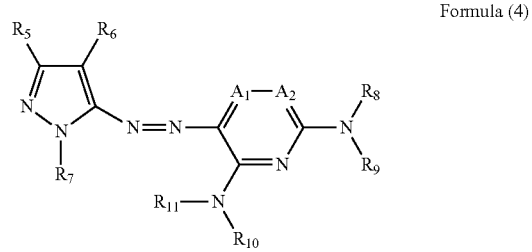

Formula (4)

wherein: $R_5$ represents a hydrogen atom, a substituted or unsubstituted alkyl group, or a substituted or unsubstituted aryl group; $R_6$ represents a hydrogen atom, a halogen atom, or a cyano group; $R_7$ represents a hydrogen atom, a substituted or unsubstituted alkyl group, a substituted or unsubstituted aryl group, or a substituted or unsubstituted heterocyclic group; and $R_8$, $R_9$, $R_{10}$, and $R_{11}$ each independently represent a hydrogen atom, a substituted or unsubstituted alkyl group, a substituted or unsubstituted aryl group, a substituted or unsubstituted heterocyclic group, a substituted or unsubstituted sulfonyl group, or a substituted or unsubstituted acyl group with the proviso that $R_8$ and $R_9$ are not hydrogen atoms at the same time, and $R_{10}$ and $R_{11}$ are not hydrogen atoms at the same time; and $A_1$ and $A_2$ are substituted or unsubstituted carbon atoms, or one of $A_1$ and $A_2$ is a substituted or unsubstituted carbon atom and the other is a nitrogen atom;

and a dye represented by formula (5):

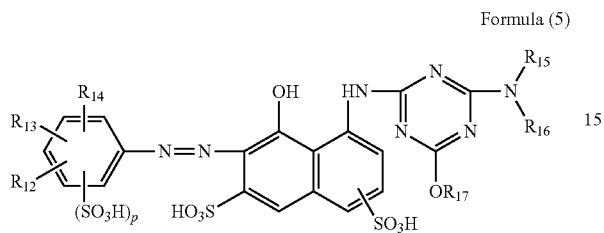

Formula (5)

wherein: $R_{12}$, $R_{13}$, and $R_{14}$ each independently represent a substituted or unsubstituted alkyl group, a substituted or unsubstituted alkoxy group, a halogen atom, a hydrogen atom, a hydroxyl group, a substituted or unsubstituted carbamoyl group, a substituted or unsubstituted sulfamoyl group, a substituted or unsubstituted amino group, a nitro group, a sulfonate group, a substituted or unsubstituted alkyl sulfonyl group, a substituted or unsubstituted aryl sulfonyl group, a carboxyl group, or a carboxylate group; p represents an integer of 0, 1, or 2; and $R_{15}$, $R_{16}$, and $R_{17}$ each independently represent a hydrogen atom, a substituted or unsubstituted alkyl group, a substituted or unsubstituted alkenyl group, a substituted or unsubstituted aryl group, a substituted or unsubstituted aralkyl group, a substituted or unsubstituted alicyclic group, or a substituted or unsubstituted heterocyclic group.

5. The ink set for ink-jet recording according to claim 3, wherein the cyan ink comprises a dye represented by formula (1):

Formula (1)

wherein Pc(Cu) represents a copper phthalocyanine nucleus represented by formula (3):

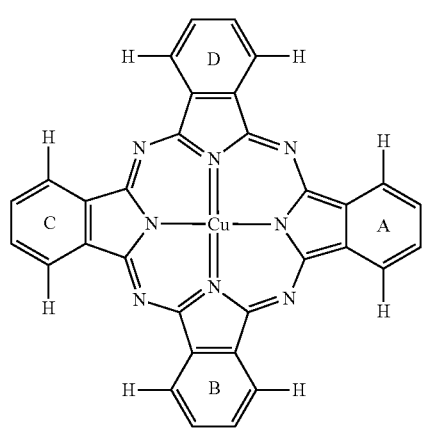

Formula (3)

and wherein: $R_1$, $R_2$, $R_3$, and $R_4$ do not simultaneously represent the same substituent and each independently represent a substituent selected from the group of $-SO_2R_a$, $-SO_2NR_bR_c$, and $-CO_2R_a$; wherein at least one of $R_1$, $R_2$, $R_3$, and $R_4$ has an ionic hydrophilic group as a substituent, at least one of $R_1$, $R_2$, $R_3$, and $R_4$ is present in each of the four benzene rings A, B, C, and D in the copper phthalocyanine nucleus of formula (3); $R_a$ represents a substituted or unsubstituted alkyl group, $R_b$ represents a hydrogen atom, or a substituted or unsubstituted alkyl group, and $R_c$ represents a substituted or unsubstituted alkyl group; wherein k represents a number that satisfies the relationship $0<k<8$, l represents a number that satisfies the relationship $0<l<8$, m represents a number that satisfies the relationship $0 \leqq m<8$, and n represents a number that satisfies the relationship $0 \leqq n \leqq 8$; and k, l, m and n are numbers that satisfy the relationship $4 \leqq k+l+m+n \leqq 8$;

and a dye represented by formula (2):

Formula (2)

wherein Pc(Cu) represents a copper phthalocyanine nucleus represented by formula (3):

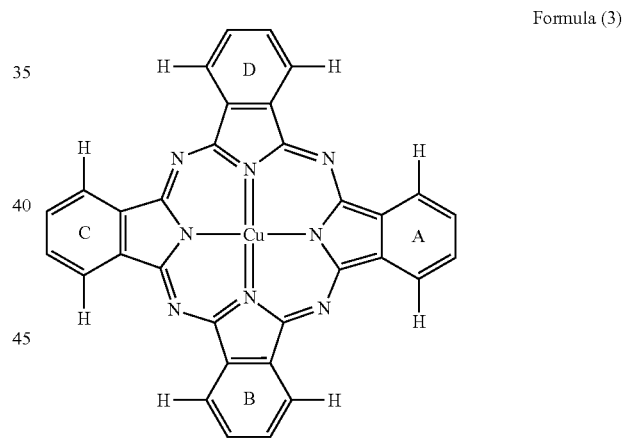

Formula (3)

and wherein each of an $SO_3M$ group and an $SO_2NH_2$ group is present in any of the four benzene rings A, B, C, and D in the copper phthalocyanine nucleus represented by formula (3); M represents a monovalent metal cation selected from the group of a lithium ion, a sodium ion, and a potassium ion; x represents a number that satisfies the relationship $0<x<4$; y represents a number that satisfies the relationship $0<y<4$; and x and y represent numbers that satisfy the relationship $2 \leqq x+y \leqq 5$.

6. The ink set for ink-jet recording according to claim 3, wherein the yellow ink includes one of Direct Yellow 86 and Direct Yellow 132, provided that the yellow ink does not include both of Direct Yellow 86 and Direct Yellow 132.

7. A method of manufacturing an ink set, comprising:
preparing a first single-color patch and a second single-color patch for each of a plurality of inks by conducting printing on ink jet recording paper under the same printing conditions between the first single-color patch and the second single-color patch;

performing a light fastness test to each of the first single-color patches and an ozone resistance test to each of the second single-color patches; and selecting an ink set by combining inks that satisfy the following formulae (a) to (d) in accordance with a result of the light fastness test and the ozone resistance test:

$$\text{Light OD reduction rate } (X\%) = [(A-B)/A] \times 100 \quad \text{(a)}$$

$$\text{Ozone OD reduction rate } (Y\%) = [(C-D)/C] \times 100 \quad \text{(b)}$$

$$\text{Total OD reduction rate } (Z\%) = X+Y < \text{about } 40\% \quad \text{(c)}$$

$$Z\max - Z\min < \text{about } 15\% \quad \text{(d)},$$

where, in the formulae (a) to (d),

"A" is an OD value before a light fastness test performed for a first single-color patch;

"B" is an OD value after a light fastness test performed for a first single-color patch;

"C" is an OD value before an ozone resistance test performed for a second single-color patch;

"D" is an OD value after an ozone resistance test performed for a second single-color patch;

"Zmax" is a maximum of all the total OD reduction rates (Z); and

"Zmin" is a minimum of all the total OD reduction rates (Z).

* * * * *